(12) United States Patent
Li et al.

(10) Patent No.: US 8,000,554 B2
(45) Date of Patent: Aug. 16, 2011

(54) AUTOMATIC DYNAMIC RANGE ADJUSTMENT IN DIGITAL IMAGING

(75) Inventors: Xing Li, Webster, NY (US); Mihai Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1047 days.

(21) Appl. No.: 11/732,805

(22) Filed: Apr. 4, 2007

(65) Prior Publication Data
US 2008/0247661 A1 Oct. 9, 2008

(51) Int. Cl.
G06K 9/40 (2006.01)
G06K 9/00 (2006.01)
G06K 1/00 (2006.01)

(52) U.S. Cl. ........ 382/274; 382/167; 382/168; 382/169; 382/254; 358/1.6; 358/1.9

(58) Field of Classification Search ............... 382/274, 382/167–169; 358/1.6, 1.9
See application file for complete search history.

(56) References Cited

U.S. PATENT DOCUMENTS

| 5,012,333 | A | * | 4/1991 | Lee et al. ..................... 358/520 |
| 5,068,718 | A | * | 11/1991 | Iwabe et al. .................. 348/675 |
| 5,293,258 | A | * | 3/1994 | Dattilo ......................... 358/518 |
| 5,339,368 | A | * | 8/1994 | Higgins-Luthman et al. .................... 382/169 |
| 5,347,374 | A | * | 9/1994 | Fuss et al. .................... 358/522 |
| 5,524,070 | A | * | 6/1996 | Shin et al. ..................... 382/274 |
| 5,546,165 | A | * | 8/1996 | Rushing et al. ................. 399/78 |
| 5,581,370 | A | * | 12/1996 | Fuss et al. .................... 358/447 |
| 5,751,848 | A | | 5/1998 | Farrell |
| 5,781,315 | A | * | 7/1998 | Yamaguchi ................... 358/520 |
| 5,796,874 | A | * | 8/1998 | Woolfe et al. ................. 382/254 |
| 5,812,286 | A | * | 9/1998 | Lin ............................... 358/519 |
| 5,982,926 | A | * | 11/1999 | Kuo et al. ..................... 382/167 |
| 6,201,893 | B1 | * | 3/2001 | Shiraiwa et al. .............. 382/167 |
| 6,204,940 | B1 | * | 3/2001 | Lin et al. ....................... 358/527 |
| 6,222,640 | B1 | * | 4/2001 | Peulen et al. .................. 358/1.9 |
| 6,285,798 | B1 | * | 9/2001 | Lee .............................. 382/260 |
| 6,463,173 | B1 | * | 10/2002 | Tretter ......................... 382/168 |
| 6,608,926 | B1 | * | 8/2003 | Suwa et al. .................... 382/162 |
| 6,618,171 | B1 | * | 9/2003 | Tse et al. ....................... 358/446 |
| 6,668,101 | B2 | * | 12/2003 | Kaneda ......................... 382/301 |
| 6,694,051 | B1 | * | 2/2004 | Yamazoe et al. .............. 382/167 |
| 6,741,295 | B2 | * | 5/2004 | Nieuwenhuizen et al. ... 348/687 |
| 6,753,987 | B1 | * | 6/2004 | Farnung et al. ............... 358/518 |
| 6,891,892 | B2 | * | 5/2005 | Yang ........................ 375/240.25 |
| 7,006,688 | B2 | * | 2/2006 | Zaklika et al. ................. 382/165 |
| 7,058,222 | B2 | | 6/2006 | Li et al. |
| 7,068,853 | B2 | * | 6/2006 | Loveridge et al. ............. 382/274 |
| 7,102,697 | B2 | * | 9/2006 | Lei et al. ....................... 348/678 |
| 7,319,787 | B2 | * | 1/2008 | Trifonov et al. .............. 382/168 |
| 7,421,143 | B2 | * | 9/2008 | Li et al. ......................... 382/274 |
| 7,760,961 | B2 | * | 7/2010 | Moldvai ........................ 382/274 |
| 2002/0141496 | A1 | * | 10/2002 | Yang ........................ 375/240.2 |
| 2002/0154326 | A1 | * | 10/2002 | Tsuchiya et al. ............... 358/1.9 |
| 2002/0154693 | A1 | * | 10/2002 | Demos et al. ............. 375/240.03 |
| 2003/0038957 | A1 | * | 2/2003 | Sharman ........................ 358/1.9 |
| 2003/0053690 | A1 | * | 3/2003 | Trifonov et al. .............. 382/168 |
| 2003/0058464 | A1 | * | 3/2003 | Loveridge et al. ............. 358/1.9 |

(Continued)

*Primary Examiner* — Jason M Repko
*Assistant Examiner* — Gandhi Thirugnanam
(74) *Attorney, Agent, or Firm* — Fay Sharpe LLP

(57) ABSTRACT

A method of performing non-linear transformation of a digital image for contrast modification. The original video input is compared to a linear transformation with gain and offset; and, the differential of the change in gain or slope and the input image Δ is multiplied by a factor m obtained from a look-up table and the product of m and Δ added to the original input to obtain the output video.

5 Claims, 4 Drawing Sheets

U.S. PATENT DOCUMENTS

| | | | |
|---|---|---|---|
| 2003/0059109 A1* | 3/2003 | Wilsher | 382/167 |
| 2003/0117654 A1* | 6/2003 | Wredenhagen et al. | 358/3.21 |
| 2003/0235342 A1* | 12/2003 | Gindele | 382/260 |
| 2004/0105104 A1* | 6/2004 | Ishikawa et al. | 358/1.6 |
| 2004/0136605 A1* | 7/2004 | Seger et al. | 382/274 |
| 2005/0013506 A1* | 1/2005 | Yano | 382/274 |
| 2005/0031200 A1* | 2/2005 | Lee et al. | 382/169 |
| 2005/0265625 A1* | 12/2005 | Li et al. | 382/274 |
| 2006/0104508 A1* | 5/2006 | Daly et al. | 382/167 |
| 2006/0104533 A1* | 5/2006 | Daly et al. | 382/254 |
| 2006/0110022 A1* | 5/2006 | Zhang et al. | 382/132 |
| 2006/0203270 A1* | 9/2006 | Shirasawa | 358/1.9 |
| 2006/0239550 A1* | 10/2006 | Pulsifer | 382/168 |
| 2006/0239581 A1* | 10/2006 | Neuman | 382/274 |
| 2006/0285768 A1* | 12/2006 | Chen | 382/274 |
| 2007/0053587 A1* | 3/2007 | Ali | 382/168 |
| 2008/0247661 A1* | 10/2008 | Li et al. | 382/254 |

* cited by examiner

AUTOMATIC DYNAMIC RANGE ADJUSTMENT IN DIGITAL IMAGING

BACKGROUND

The present disclosure relates to digital imaging and particularly in devices employed for scanning, copying and printing in enterprise or office environments where the user can input a document either as a printed sheet or an electronically created document such as from a desktop computer into a multi-function device for effecting scanning, copying and printing as the case may be. Heretofore, the technique of dynamic range adjustment of the image has been performed for image compression and the purpose of background suppression; however, this can result in changing of the colors of the image in the case of a colored document thereby producing undesired shifts in the appearance of the image. The linear transformation employed for image compression and background suppression has utilized a gain change and an offset based upon a mapping of the pixel content distribution in the image. This technique has provided image compression and background suppression but as mentioned before, has not been altogether satisfactory when applied to color images.

Thus, it has been desired to provide a way or means of image compression and background suppression of digital imaging in any manner which can provide desired contrast changes and background suppression without distorting the colors or overall appearance of the image.

BRIEF DESCRIPTION

The present disclosure describes and illustrates a technique of dynamic range adjustment in digital imaging which allows adjustment of the contrast in portions of the image without distortion of the color content of the image.

The method of the present disclosure maps the pixel count of the image against the luminance on a scale of 0 to 255 and performs a transform which includes a non-linear relationship between the input and the output for the region of pixels for which it is desired to alter the contrast or provide background suppression. If desired, a portion of the transform or pixels having a luminance within a selected band may be subjected to a linear transform with the remaining pixel content utilizing a transform which employs a correction factor obtained from a look-up table of the curve values and an adjustment factor computed with respect to the difference between the original input and the linear transform using the correction factor obtained from the look-up table.

In the present practice, the look-up table of the values of the graph utilizes a non-linear curve of a selected shape in the regions to be modified; although, a correction factor may be applied from the look-up table for the entire range of pixel luminance if it is desired to completely alter the appearance of the image.

DETAILED DESCRIPTION

Figure 1:
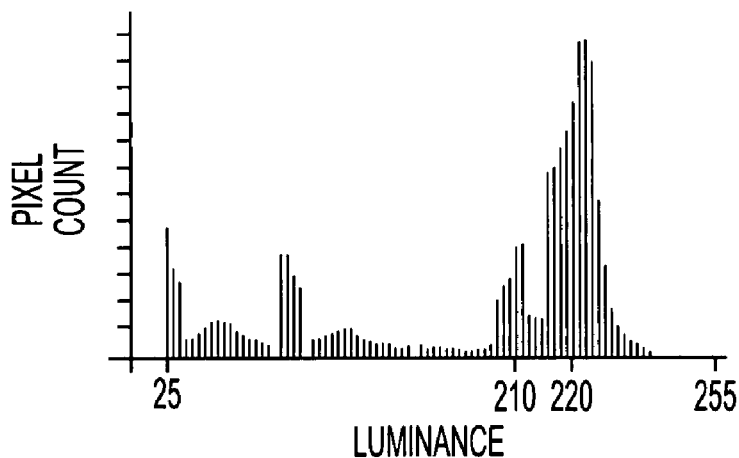
FIG. 1 is an exemplary histogram of the distribution of pixel luminance for a digital image to be modified.

Referring to FIG. 1, the pixel count of an exemplary image is plotted in a histogram of the luminance of the pixels on a scale of 0 to 255. The region of the black point is chosen as pixels having a luminance of less than 25; and, the white point is chosen as pixels having a luminance of greater than 210.

Figure 2:
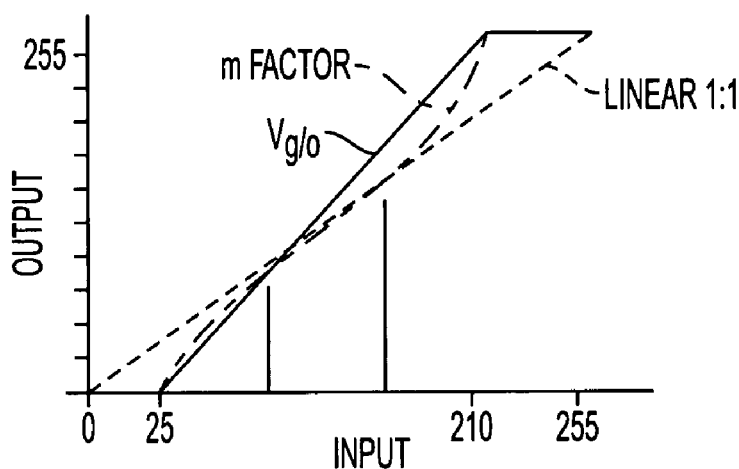
FIG. 2 is a graphical representation of a linear transform with no correction, with a gain and offset and with the transformation of the present disclosure.

Referring to FIG. 2, the direct linear transformation is shown graphically as a plot having a slope of 45 degrees or output equal to the input is shown in dashed line; and, a linear transformation in the region of pixel luminance of 25-210 is shown in solid line indicating the offset and the change in gain or slope and is identified as $V_{g/o}$. An exemplary transformation in accordance with the present disclosure is indicated in dashed and dotted line which is curvilinear outside of a linear region denoted by the vertical lines in FIG. 2 and identified by the m factor legend and will hereinafter be described in greater detail.

Figure 5:
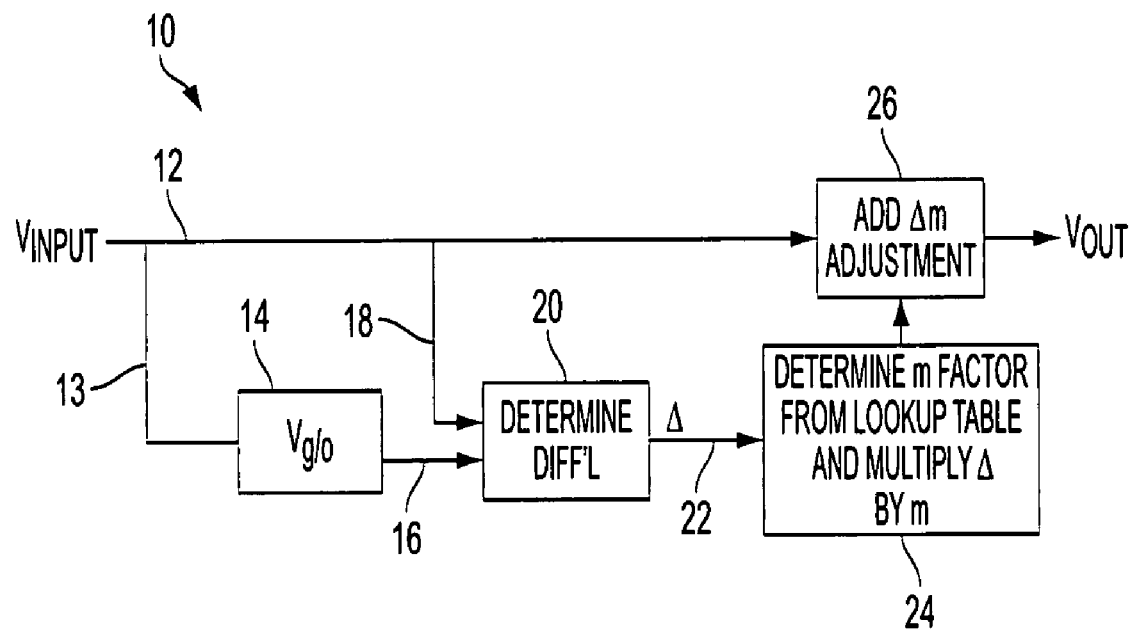
FIG. 5 is a diagram of the procedure for determining the adjustment factor.

Referring to FIG. 5, the procedure for computing the adjustment factor is indicated in block diagram generally at 10 wherein the input video $V_{INPUT}$ is along line 12 and is inputted to block 14 along line 13 for the computation of the $V_{g/o}$ as follows on a pixel by pixel basis:

$$V_{g/o} = (V_{INPUT} - \text{black point}) * 255 / (\text{white point} - \text{black point})$$

$V_{g/o}$ is inputted along line 16 along with the input along line 18 to the block 20 where the differential $\Delta$ is computed as follows.

$$\Delta = V_{g/o} - V_{INPUT}$$

The differential $\Delta$ is then inputted along line 22 to block 24 where the system determines the m factor from a look-up table of the selected type of transformation values and $\Delta$ is then multiplied by the factor m. An exemplary graphical representation of a plot of a look-up table of values is shown in FIG. 3 where the m factor is employed for pixel values less than 65 and greater than 187.

An adjustment factor determined by the operation of block 24 comprising m×$\Delta$ is then added to the value of $V_{INPUT}$ at block 26 to provide the output $V_{OUT}$. Thus, the transformation in the region outside of the linear portion is performed in accordance with the procedure described with respect to FIGS. 3 and 5 and produces the transformation shown in dashed and dotted line in FIG. 2.

Figure 4:
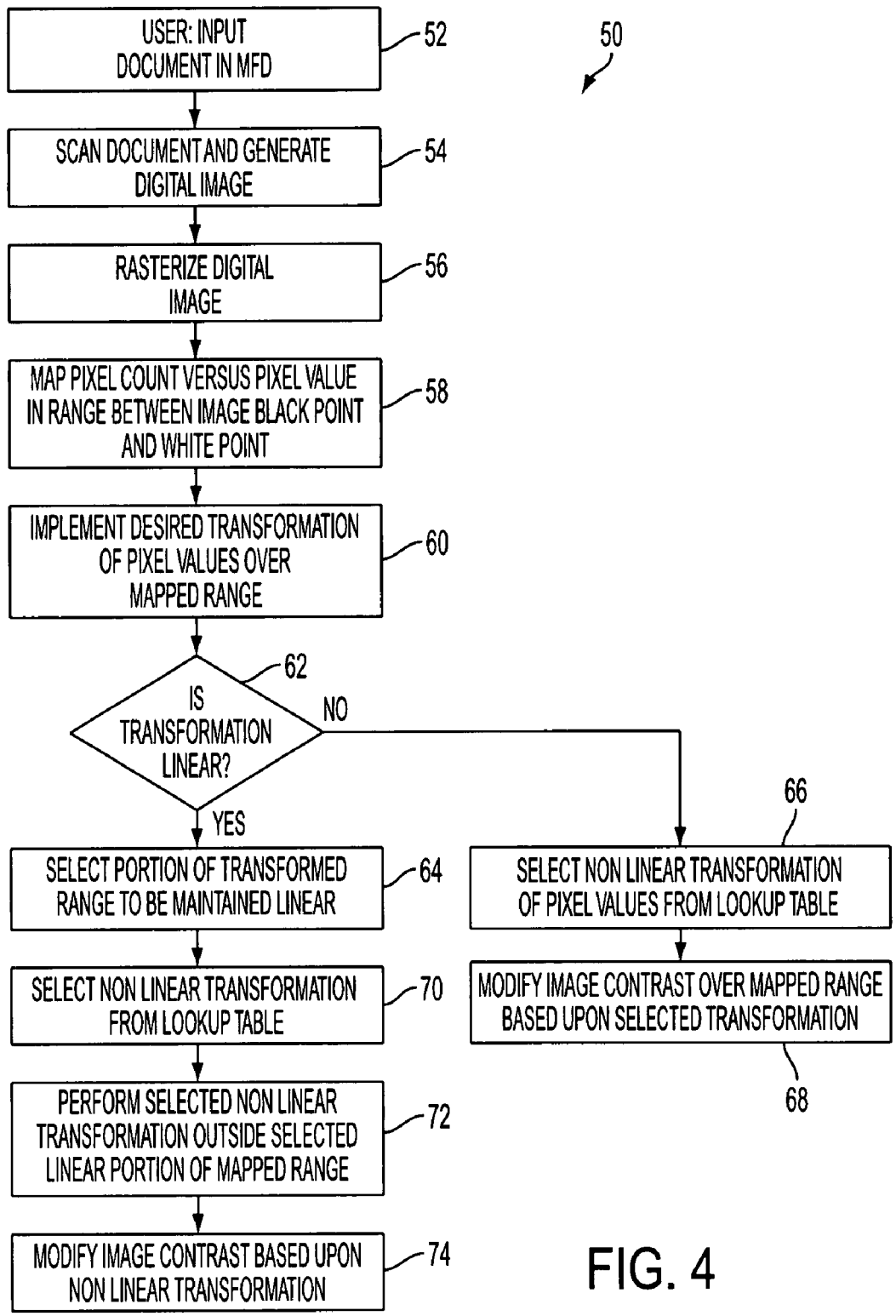
FIG. 4 is a block flow diagram of the operation of the system for performing the image modification in accordance with the present disclosure.

Referring to FIG. 4, a block flow diagram of the operation of the system is indicated generally at 50 where the user inputs the document at step 52 and the system proceeds to step 54 and scans the document to generate a digital image at step 54. The digital image is then rasterized at step 56 and the pixel count is mapped against pixel value in the range between the image black point and the image white point at step 58. The system then proceeds to step 60 and a desired transformation is implemented for the pixel values over the mapped range.

Figure 3:
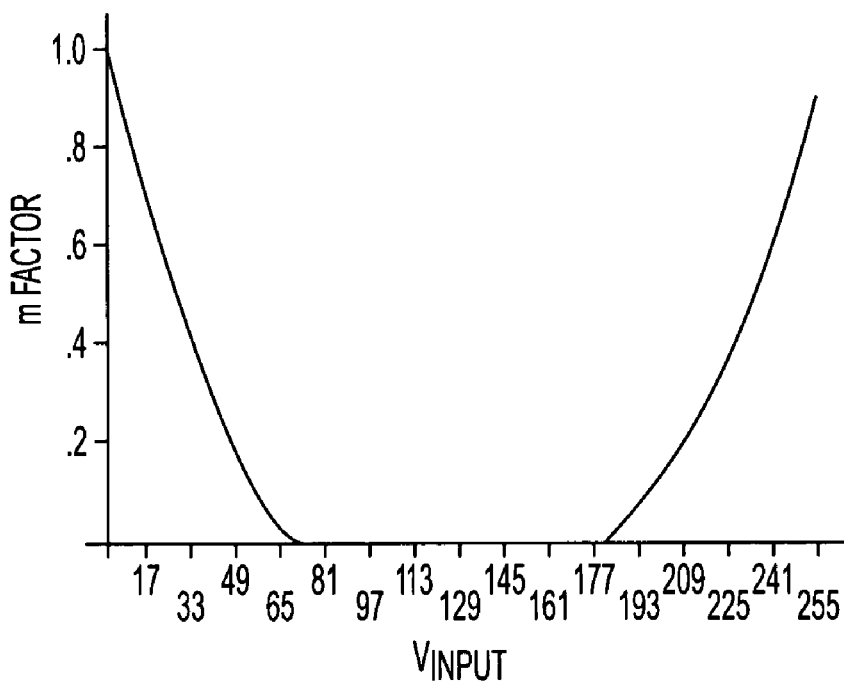
FIG. 3 is a graphical representation of the values to be employed for the correction factor.

An exemplary transformation is illustrated in FIG. 3, where values of the m factor are plotted as a function of $V_{INPUT}$ corresponding to pixel luminance values.

The system then proceeds to step 62 to make a determination as to whether the selected transformation is linear; and, if the determination is affirmative, the system proceeds to step 64 and selects a portion of the transformed range to be maintained linear. However, if the determination at step 62 is negative, the system proceeds to step 66 to select a non-linear transformation from a look-up table and the attendant m factor is determined as described hereinabove with respect to FIGS. 3 and 5. The system then proceeds at step 68 to modify the image contrast over the mapped range based on the selected non-linear transformation.

Where the transformation is to include a linear portion, the system proceeds from step 64 to step 70 to select a non-linear transformation from a look-up table for values outside of the linear range. This is the determination of the m factor as exemplified in FIG. 3. The system then proceeds to step 72 and performs a selected non-linear transformation for the values outside the selected linear portion and at step 74 the image contrast is modified based upon the non-linear transformation of step 72.

Figure 6:
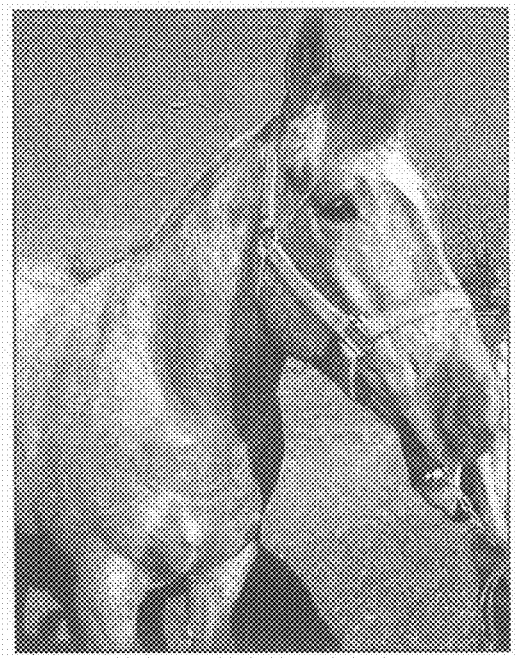
FIG. 6 is a print of an exemplary image in its original form.
Figure 7:
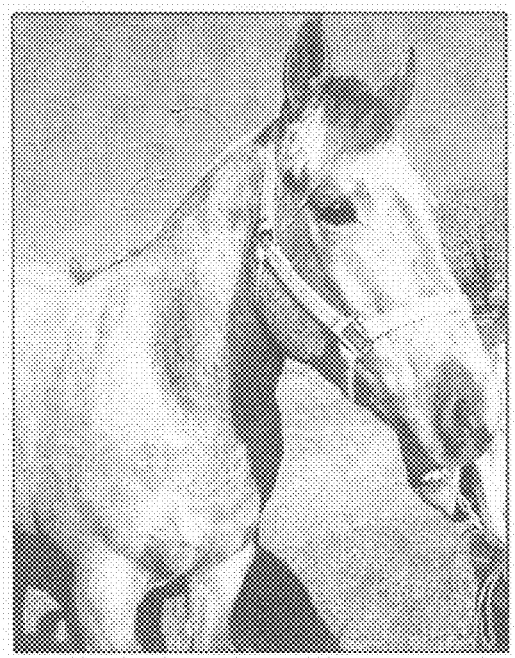
FIG. 7 is a print of the image of FIG. 6 after transformation in accordance with the present disclosure.

An example of an image which has not been modified is shown in FIG. 6; and, an image which has been modified in accordance step 74 based upon the transformation of FIG. 3, is illustrated in FIG. 7.

The present disclosure thus describes and illustrates modification of a digital image for image compression and contrast adjustment without distorting the color of the image.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of controlling contrast in digital printing comprising:
    (a) scanning a document to be copied and printed and generating a digital image thereof;
    (b) mapping a pixel count and pixel values on a scale for a range of pixel values in the image between a black point and a white point range of pixel values for the image;
    (c) performing a linear transformation of the mapped values over said range;
    (d) selecting a portion of said range and performing a non-linear transformation outside said portion; and,
    (e) altering the image contrast for each pixel in the image based upon the non-linear transformation, a computed adjustment factor and a correction factor obtained from a look-up table;
    wherein the adjustment factor is computed by:

$$V_{g/o} = (V_{input} - \text{black point}) * 255 / (\text{white point} - \text{black point});$$

$$\text{delta} = V_{g/o} - V_{input};$$

$$V_{out} = V_{input} + m * \text{delta};$$

where $V_{g/o}$, is the change in gain; $V_{input}$ is a value of a pixel; where the factor m is determined from a look-up table of selected transformation values; where $V_{out}$ is the adjustment factor.

2. A method of digital reproduction of documents comprising:
    (a) scanning a document to be reproduced and generating a digital image thereof;
    (b) mapping the pixel count of the image and pixel values on a scale for a range of pixels in the image between a black point and a white point range of pixel values for the image;
    (c) performing a linear transformation of the mapped pixel values over the range and performing a non-linear transformation over a selected portion of the range
    (d) altering the image contrast for each pixel in the image based upon the non-linear transformation, a computed adjustment factor and a correction factor obtained from a look-up table;
    wherein the adjustment factor is computed by:

$$V_{g/o} = (V_{input} - \text{black point}) * 255 / (\text{white point} - \text{black point});$$

$$\text{delta} = V_{g/o} - V_{input};$$

$$V_{out} = V_{input} + m * \text{delta};$$

where $V_{g/o}$, is the change in gain; $V_{input}$ is a value of a pixel; where the factor m is determined from a look-up table of selected transformation values; where $V_{out}$ is the adjustment factor.

3. The method defined in claim 2, further comprising displaying the image with the modified contrast on a screen.

4. The method defined in claim 2, further comprising printing the image with the modified contrast on a print media sheet.

5. The method defined in claim 2, wherein the step of mapping pixel values includes mapping values of pixel luminance.

* * * * *